United States Patent [19]

Zeno et al.

[11] 4,346,640
[45] Aug. 31, 1982

[54] DECORATIVE LIGHT FLASHING APPARATUS AND ACOUSTO-ELECTRIC TRANSDUCER THEREFOR

[75] Inventors: John R. Zeno, New York; William Rosenhagen, Ossining, both of N.Y.

[73] Assignee: Ideal Toy Corporation, Hollis, N.Y.

[21] Appl. No.: 97,257

[22] Filed: Nov. 26, 1979

[51] Int. Cl.³ .............................................. A63J 17/00
[52] U.S. Cl. ................................. 84/464 R; 179/180; 181/166
[58] Field of Search ...................... 84/464 R; 179/180; 181/160

[56] References Cited

U.S. PATENT DOCUMENTS

| | | | |
|---|---|---|---|
| 1,690,279 | 11/1928 | Craft | 84/464 R |
| 2,256,270 | 9/1941 | Swift | 181/166 X |
| 4,256,009 | 3/1981 | Verduin et al. | 84/464 R |

*Primary Examiner*—Lawrence R. Franklin
*Attorney, Agent, or Firm*—Richard M. Rabkin

[57] ABSTRACT

A decorative light flashing apparatus employs a mass-damped dynamic microphone which preferentially responds to impulse-type sounds to trigger a timing circuit. The timing circuit produces pulses in response to the impulse-type sounds which drive a commutating circuit for sequentially illuminating a plurality of light sources in time to the impulse-type sounds.

6 Claims, 5 Drawing Figures

DECORATIVE LIGHT FLASHING APPARATUS AND ACOUSTO-ELECTRIC TRANSDUCER THEREFOR

BACKGROUND OF THE INVENTION

The present invention relates to apparatus for flashing decorative lamps in time with an acoustic input.

Most attempts to control decorative flashing lamps have concentrated on frequency separation of an acoustic input into a plurality of acoustic frequency bands and individually controlling lamps or other electrically controllable devices according to whether the amplitude in specific frequency bands exceeds predetermined thresholds.

U.S. Pat. No. 3,294,322 employs electronic frequency and rhythm discrimination to control water jets and illumination in an artificial fountain display. U.S. Pat. No. 3,736,832 alternately illuminates and extinguishes sets of lamps according to the crossing of a plurality of slicing thresholds by the amplitude of an audio signal.

OBJECTS AND SUMMARY OF THE INVENTION

It is an object of the present invention to flash a plurality of lamps one at a time in synchronism with the rhythm of music from an external sound source.

It is a further object of the invention to provide a decorative lamp flashing apparatus which employs a mass-damped dynamic microphone which is preferentially responsive to impact-type sounds of music rhythm to drive a timing and commutating circuit to alternately flash decorative lamps one at a time in synchronism with the music.

It is a further object of the invention to provide a decorative light flashing apparatus using a mass-damped acousto-electric transducer preferentially responsive to impulse-type sounds to trigger a sequential lamp-flashing apparatus.

According to an aspect of the invention, there is provided an acousto-electric transducer comprising a permanent magnet loudspeaker having a speaker cone, a voice coil affixed to the speaker cone and operative to vibrate therewith and a permanent magnet, the voice coil encircling the permanent magnet whereby an electric signal is induced in the voice coil when it is forced to vibrate by motion of the speaker cone, the speaker cone having a low frequency cutoff, a damping mass affixed to the speaker cone, and the speaker cone with the damping mass affixed thereto having a resonant frequency which is substantially lower than the low frequency cutoff of the speaker cone.

According to a feature of the invention, there is provided a decorative light flashing apparatus comprising acousto-electric transducer means for preferentially responding to impulse-type sounds, triggerable means responsive to the transducer means for producing pulse-type signals, means responsive to the pulse-type signals for producing at least two commutating output signals, and the at least two commutating output signals being capable of individually illuminating at least two light sources.

The above and other objects, features and advantages of the present invention will become apparent from the following description read in conjunction with the accompanying drawings in which like reference numerals designate the same elements.

BRIEF DESCRIPTION OF THE DRAWINGS

FIG. 5 is a perspective view of a mass-damped dynamic microphone according to an embodiment of the present invention.

DETAILED DESCRIPTION OF THE PREFERRED EMBODIMENT

Figure 1:
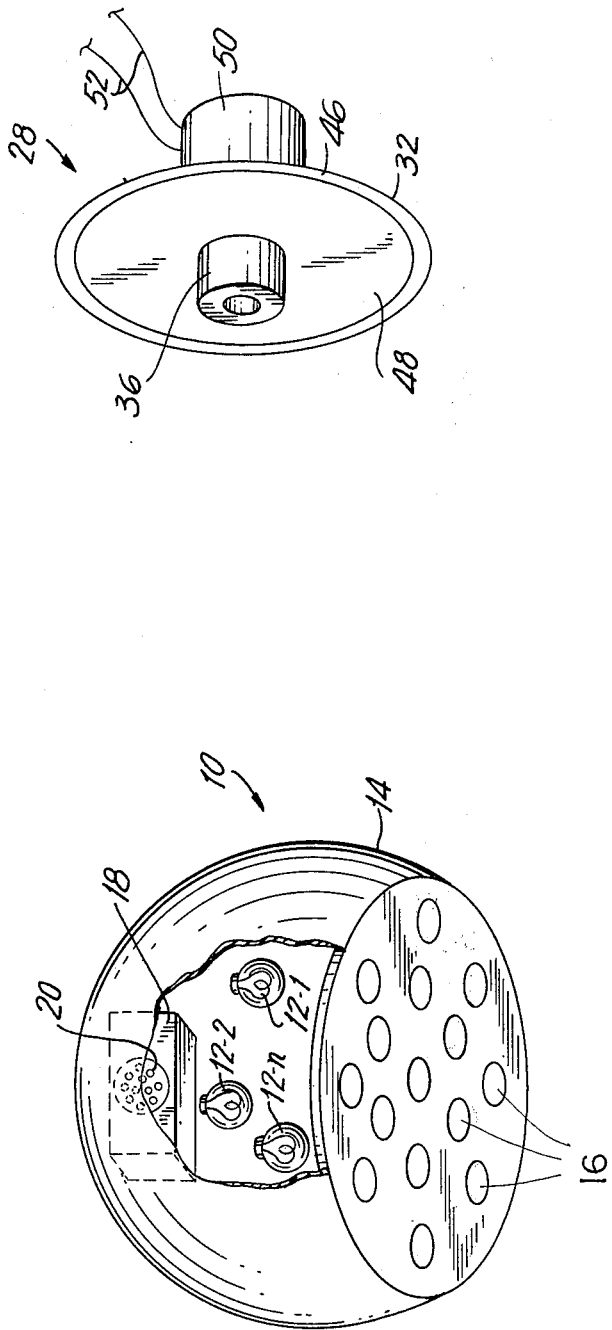
FIG. 1 is a perspective view, partially cut away of a decorative light flashing apparatus according to an embodiment of the present invention.

Referring now to FIG. 1, there is shown, generally at 10, a decorative light flashing apparatus according to an embodiment of the present invention. A plurality of light sources 12-1, 12-2, 12-N, which may be any convenient type of light source, but are preferably incandescent lamps, are disposed in a decorative fixture 14. Decorative fixture 14 may be transparent or semi-transparent to permit direct viewing of light sources 12-1 through 12-N or may contain lens-like transparent portions, such as shown at 16, for projecting light from light sources 12-1 through 12-N onto a surface. Alternatively, light sources 12-1 through 12-N may be spot or flood lamp type bulbs capable of projecting spots or other patterns of light on a surface.

A control system 18 which may be located inside or remote from decorative fixture 14, but which is preferably located inside as shown, contains circuits which sequence light sources 12-1 through 12-N according to an acoustic input. An acoustic inlet which may be, for example, a plurality of holes 20 admit sound to control system 18.

Figure 2:
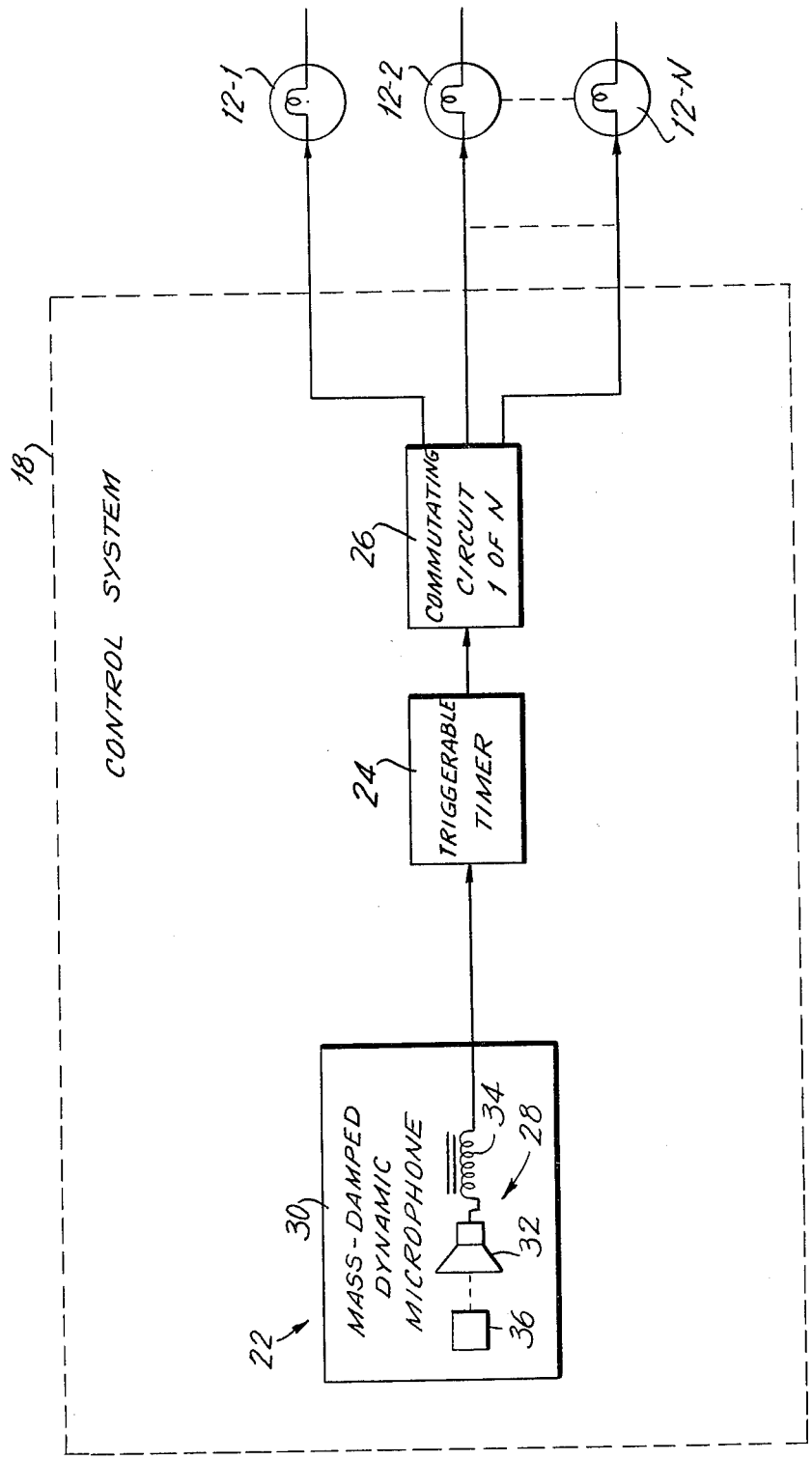
FIG. 2 is a simplified block diagram showing the control system of FIG. 1.

Referring now to FIG. 2, control system 18 is seen to consist of an acousto-electric transducer 22, a triggerable timer 24 and a 1-of-N commutating circuit 26.

Acousto-electric transducer 22 consists of a mass-damped dynamic microphone 28 enclosed in a resonant chamber 30. Mass-damped dynamic microphone 28 consists of a permanent magnet loudspeaker 32 of a well known type having a paper cone with a voice coil 34 affixed to and vibrating therewith and a permanent magnet (not shown) whose lines of flux are cut by voice coil 34. A damping mass 36 is affixed to the paper cone to change the vibrational characteristics thereof. Permanent magnet loudspeaker 32 is selected to have a low frequency cut off at a relatively high frequency such as, for example, 200 Hz. This is readily accomplished by employing a two-inch paper cone loudspeaker. Thus, permanent-magnet loudspeaker 32, in the absence of damping mass 36, is substantially incapable of responding to frequencies below from about 190 to about 210 Hz and preferably below about 200 Hz. When damping mass 36 is affixed to the speaker cone, the resonant frequency of the speaker cone-damping mass combination is lowered to below the low frequency cutoff of permanent magnet loudspeaker 32. In the preferred embodiment, the resonant frequency of mass-damped dynamic microphone 28 is from about 160–170 Hz. As a result of mass damping, mass-damped dynamic microphone 28 is incapable of responding linearly to input frequencies but instead, is capable of heavily damped oscillation at its self-resonant frequency in response to impulse-type sounds of almost any frequency. Thus, mass-damped dynamic microphone 28 produces spikes of output signals in response to the beat or tempo of music or other sounds.

Resonant chamber 30 enhances the response of mass-damped dynamic microphone 28. Resonant chamber 30 is resonant at about the self-resonant frequency of mass-damped dynamic microphone 28 to more efficiently convert impulse-type sounds into output spikes.

The output spikes from acousto-electric transducer 22 are applied to an input of triggerable timer 24. Triggerable timer 24 is arranged as an astable multivibrator having a natural frequency of any convenient value such as, for example, about one second, but which is capable of being triggered into producing an output pulse at substantially any time in response to input spikes from acousto-electric transducer 22. Thus, in the absence of an appropriate acoustic input to acousto-electric transducer 22, triggerable timer 24 produces one output pulse about each second. Conversely, when appropriate sounds are applied to acousto-electric transducer 22, triggerable timer 24 produces output pulses substantially in time with the generated spikes.

The pulses from triggerable timer 24 are applied to commutating circuit 26. Commutating circuit 26 energizes one output line at a time and, upon receiving each input pulse, transfer the energization from a previously energized line to another energized line in repeating sequence. For example, a commutating circuit 26 may energize light source 12-1 and upon receiving the next input pulse extinguish light source 12-1 and energize light source 12-2 and repeat this operation until light source 12-N is energized whereupon light source 12-N is extinguished and the sequence begins again with light source 12-1.

Figure 3:
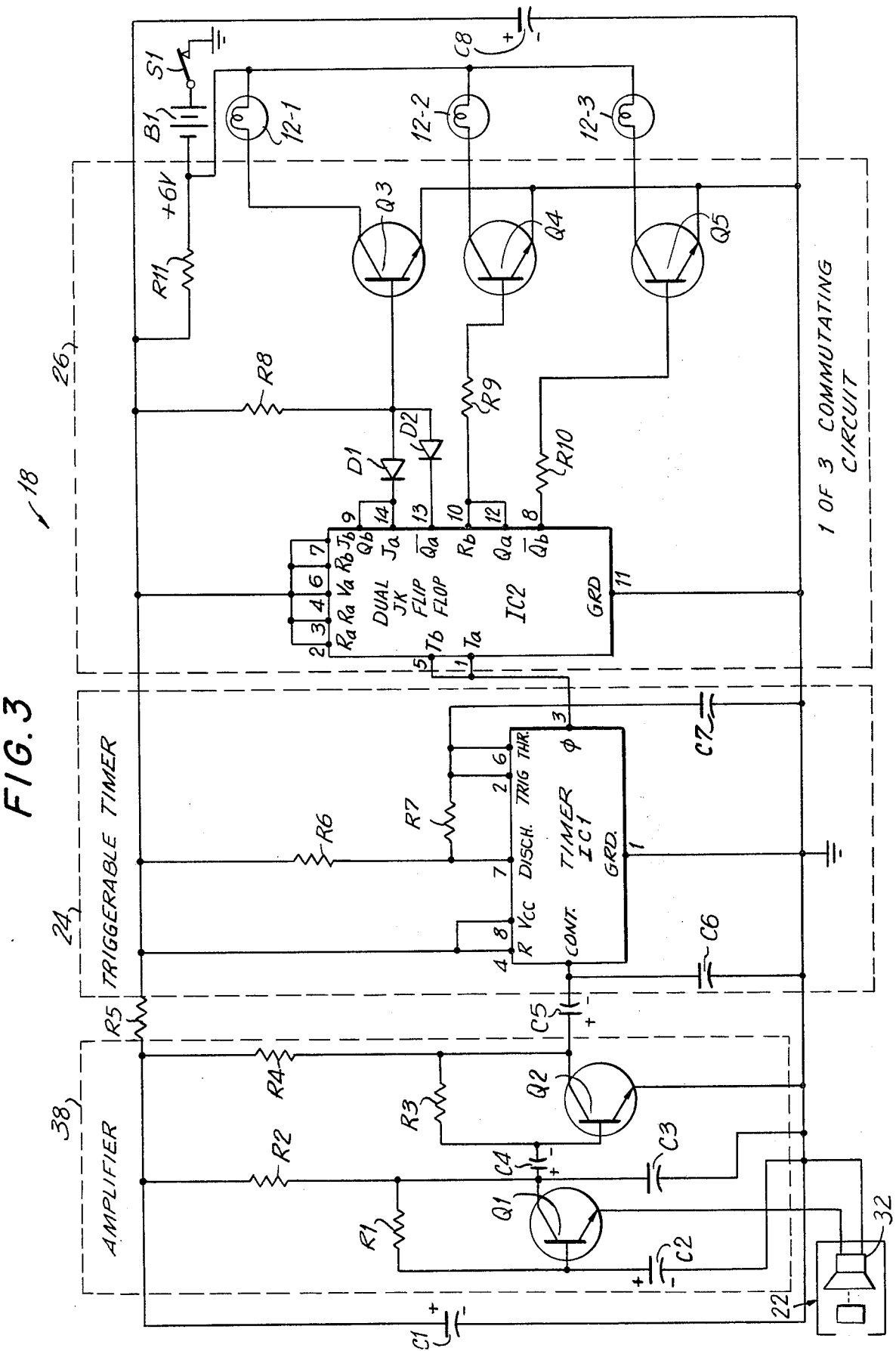
FIG. 3 is a detailed schematic diagram of the control system of FIGS. 1 and 2.

Referring now to FIG. 3, a control system 18 for sequentially illuminating three light sources 12-1, 12-2 and 12-3 is shown in greater detail. An amplifier 38 having transistors Q1 and Q2 amplifies the output of acousto-electric transducer 22 before applying it to triggerable timer 24. The voice coil of permanent magnet loudspeaker 32 is in series from the emitter of transistor Q1 to ground. A collector resistor R2 and a base resistor R1 provide appropriate operating bias for transistor Q1. Transistor Q1 is thus connected in common base configuration to provide good isolation between its input and its output. The output of transistor Q1 is applied through capacitor C4 to the base of transistor Q2. Resistors R4 and R3 provide collector and base bias respectively to transistor Q2. After further amplification in transistor Q2, the impulse signals are applied through capacitor C5 to the control input of timer integrated circuit IC1. Timer integrated circuit IC1 is preferably a standard 555 timer. Timing resistors R6 and R7 as well as timing capacitor C7, connected as shown, provide an untriggered timing cycle of $T=(1)/1.44 (R6+2R7)C7$. For the values given in the parts list herein, T equals 0.975 seconds. When a signal is applied to the control input of integrated circuit IC1 which exceeds an internal threshold, an output pulse is immediately generated without waiting for the end of the normal timing interval. Thus, when a continuing series of impulse signals are supplied thereto, timer integrated circuit IC1 produces a corresponding series of output pulses substantially in time therewith.

Output pulses from integrated circuit IC1 are applied to a dual JK flip-flop integrated circuit IC2. The two JK flip-flops in flip-flop integrated circuit IC2 are connected as a modulo 3 counter which completes a cycle and resets itself at the end of three input pulses. Diodes D1 and D2 function as an AND gate as will be explained.

Figure 4:
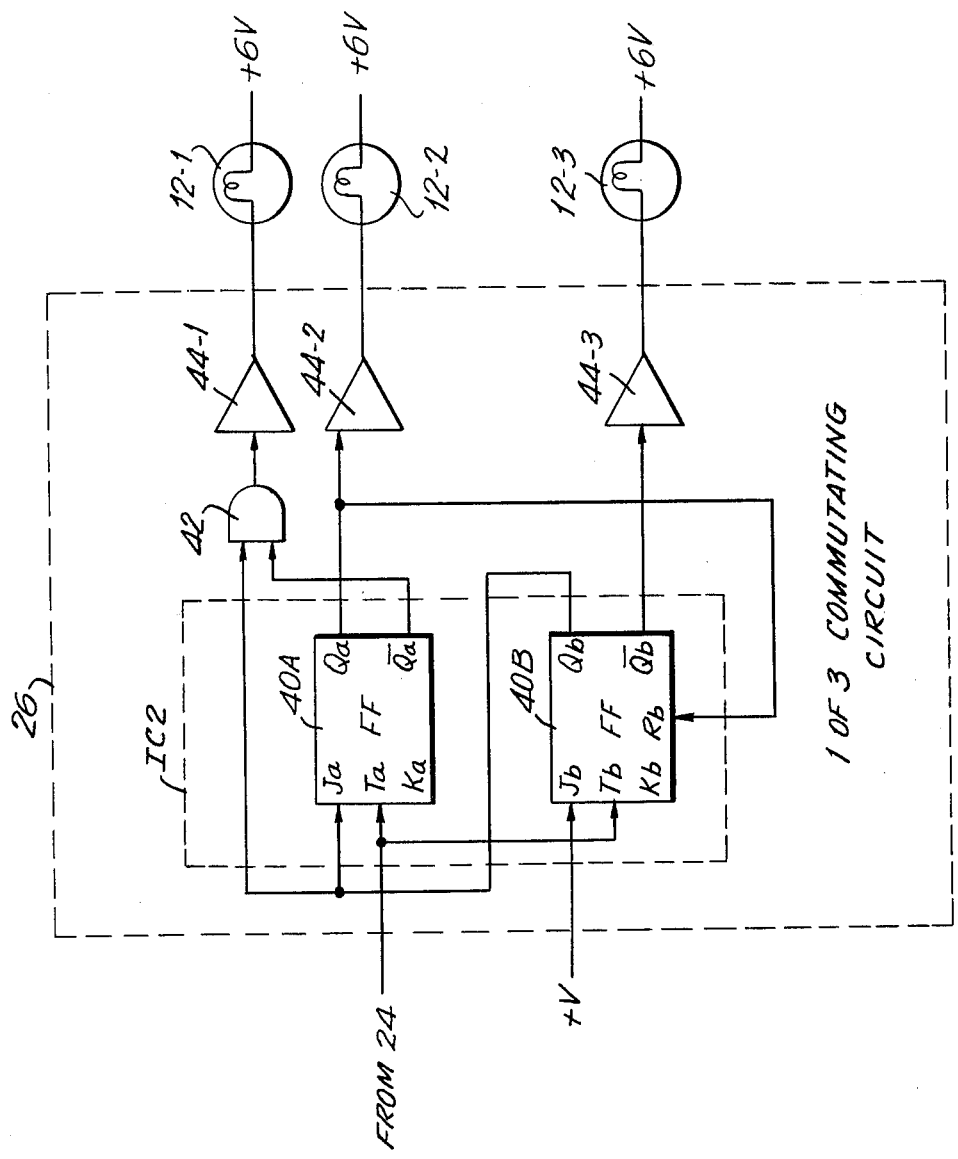
FIG. 4 is a detailed logic diagram of a 1 of 3 commutating circuit of FIGS. 2 and 3.

Referring momentarily to FIG. 4, the portion of the circuit including flip-flop integrated circuit IC2 and diodes D1 and D2 are shown in greater detail. Pulses from triggerable timer 24 are applied to the trigger input $T_a$ of a first JK flip-flop 40A and the trigger input $T_b$ of a second JK flip-flop 40B. The set output $Q_b$ of JK flip-flop 40B is applied to the J input $J_a$ of first JK flip-flop 40A and to an input of AND gate 42. The J input $J_b$ of second flip-flop 40B receives a constant positive voltage +V. The reset output $\overline{Q_b}$ is applied through an amplifier 44-3 (corresponding to transistor Q5 of FIG. 3) to light source 12-3. The set output $Q_a$ of first JK flip-flop 40A is applied through an amplifier 44-2 (corresponding to transistor Q4 of FIG. 3) to light source 12-2 and to the reset input $R_b$ of second JK flip-flop 40B. The reset output $\overline{Q_a}$ of first JK flip-flop 40A is applied to a second input of AND gate 42. It will be evident to one skilled in the art that AND gate 42 corresponds to diodes D1 and D2 with resistor R8 of FIG. 3. The output of AND gate 42 is applied through amplifier 44-1 (corresponding to transistor Q3) to light source 12-1.

The connection from the set output $Q_b$ of second JK flip-flop 40B to the J input $J_a$ of first JK flip-flop 40A and from the set output $Q_a$ of first JK flip-flop 40A to the reset input $R_b$ of second JK flip-flop 40B produces modulo 3 cycling of the two JK flip-flops 40A and 40B. The following truth table shows the states of the two JK flip-flops and the resulting lamps which are illuminated thereby:

TRUTH TABLE

| $Q_a$ | $Q_b$ | Lamp |
|---|---|---|
| "0" | "0" | 12-3 |
| "0" | "1" | 12-1 |
| "1" | "1" | 12-2 |
| "0" | "0" | 12-3 |

For purposes of description, it is assumed that JK flip-flops 40A and 40B are both in the reset condition providing binary "1" outputs from their reset terminals $\overline{Q_a}$ and $\overline{Q_b}$ and binary "0" outputs from their set outputs $Q_a$ and $Q_b$. Under this condition, light source 12-3 is illuminated and light sources 12-1 and 12-2 are extinguished. Upon the arrival of the next pulse input from triggerable timer 24 at trigger inputs $T_a$ and $T_b$, JK flip-flop 40B is triggered into the set condition due to the voltage +V at its J input $J_b$ and JK flip-flop 40A remains in the reset condition due to the binary "0" applied to its J input $J_a$ from the set output $Q_b$ of JK flip-flop 40B. This condition enables both inputs of AND gate 42 and illuminates light source 12-1 and extinguishes light source 12-3. Upon the arrival of the next pulse from triggerable timer 24, JK flip-flop 40A is triggered into the set condition due to the binary "1" at its J input $J_a$. The set output $Q_a$ from JK flip-flop 40A is applied through amplifier 44-2 to illuminate light source 12-2. The binary "0" now appearing at the reset output $\overline{Q_a}$ of JK flip-flop 40A inhibits AND gate 42 and extinguishes light source 12-1. Upon the next arriving pulse from triggerable timer 24, the binary "1" fed from the reset output $\overline{Q_a}$ of JK flip-flop 40A to the reset input $R_b$ of JK flip-flop 40B immediately resets JK flip-flop 40B on the leading edge of the input pulse. This presents a binary "0" to the J input $J_a$ of JK flip-flop 40A at the trailing edge of the pulse from triggerable timer 24. Thus, the trailing edge of the pulse from triggerable timer 24 resets JK flip-flop 40A to cause the modulo 3 counter to return to its original condition wherein light source 12-3 is illuminated and the other light sources 12-1 and 12-2 are extinguished.

Returning now to FIG. 3, it is seen that transistors Q3-Q5 provide a ground connection for one side of their associated light sources 12-1 through 12-3 when they receive an appropriate signal from flip-flop integrated circuit IC2. The other sides of light sources 12-1 through 12-3 are connected together to a source of voltage such as a six volt battery B1. An ON-OFF switch S1 may be employed to turn the apparatus ON and OFF. A limiting resistor R11 limits the current fed to the remainder of the circuits. In addition, an additional limiting resistor R5 limits the current fed to amplifier 38.

Referring now to FIG. 5, there is shown a mass-damped dynamic microphone 28 in which permanent magnet loudspeaker 32 has a substantially circular frame 46 supporting a paper loudspeaker cone 48 at its outer perimeter. A permanent magnet (not shown) is supported in a rear frame 50 and electrical signals are coupled from mass-damped dynamic microphone 28 to other circuits by electrical leads 52.

As noted, permanent magnet loudspeaker 32 is preferably a two-inch loudspeaker. Damping mass 36 may be selected to produce a desired resonant frequency of the speaker cone-damping-mass system and is about 2.5 grams in the preferred embodiment. Damping mass 36 is affixed by any convenient means, such as by glue to loudspeaker cone 48. In order to avoid interference with the motion of loudspeaker cone 48, damping mass 36 is preferably a hollow cylinder in at least a portion of its volume. The applicant has discovered that a suitable damping mass 36 may be formed using a rubber foot typically employed on the bottom of electronic equipment which measures about 0.4 inches in diameter and 0.4 inches in height.

It would be clear to one skilled in the art that other sizes of loudspeaker and weights of damping masses may be selected to achieve the desired result.

In one embodiment of the invention which was reduced to practice, the following part identities and values were found to give satisfactory performance:

| LIST OF PARTS | | | | | |
|---|---|---|---|---|---|
| RESISTORS (OHMS) | | CAPACITORS (MICROFARADS) | | TRANSISTORS | |
| R1 | 2.2M | C1 | 100 | Q1 | 2N3904 |
| R2 | 47K | C2 | 1 | Q2 | 2N3904 |
| R3 | 4.7M | C3 | 0.1 | Q3 | MPSA13 |
| R4 | 15K | C4 | 1 | Q4 | MPSA13 |
| R5 | 390 | C5 | 1 | Q5 | MPSA13 |
| R6 | 4.7M | C6 | 0.1 | | |
| R7 | 4.7M | C7 | 0.1 | | |
| R8 | 4.7K | | | DIODES | |
| R9 | 4.7K | | | D1 | IN4148 |
| R10 | 4.7K | | | D2 | IN4148 |
| R11 | 390 | | | | |
| INTEGRATED CIRCUITS | | | | | |
| IC1 | 555 TIMER | | | | |
| IC2 | 74C73 DUAL JK FLIP-FLOP | | | | |
| MISC | | | | | |
| B1 | 6V Battery | | | | |
| S1 | SPST Switch | | | | |

| LIST OF PARTS -continued |
|---|
| L1, L2, L3 - 6V Lamps |

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A decorative light flashing apparatus comprising: acousto-electric transducer means for preferentially responding to impulse-type sounds; triggerable means responsive to said transducer means for producing pulse-type signals; means responsive to said pulse-type signals for producing at least two commutating output signals; and said at least two commutating output signals being capable of individually illuminating at least two light sources.

2. A decorative flashing light apparatus comprising:
p1 a fixture;
   a plurality of light sources in said fixture;
   a control system for sequentially energizing said plurality of light sources one at a time; and
   said control system including an acousto-electric transducer responsive to impulse-type sounds, and a triggerable timer, said acousto-electric transducer being operative to trigger said triggerable timer into producing electrical signals substantially in time with said impulse-type sounds, and a commutating circuit responsive to said electrical signals for sequentially energizing said plurality of light sources in a predetermined repeating sequence.

3. An apparatus according to claim 2; wherein said acousto-electric transducer includes:
   a permanent magnet loudspeaker having a speaker cone, a voice coil affixed to said speaker cone and operative to vibrate therewith and a permanent magnet;
   said voice coil encircling said permanent magnet whereby an electric signal is induced in said voice coil when it is forced to vibrate by motion of said speaker cone;
   said speaker cone having a low frequency cutoff;
   a damping mass affixed to said speaker cone; and
   said speaker cone with said damping mass affixed thereto having a resonant frequency which is substantially lower than said low frequency cutoff of said speaker cone.

4. An apparatus according to claim 3; wherein said acousto-electric transducer further includes a resonant chamber surrounding said loudspeaker, said resonant chamber having a second resonant frequency substantially the same as said resonant frequency.

5. A decorative light flashing apparatus comprising: an acousto-electric transducer which includes:
   a permanent magnet loudspeaker having a speaker cone, a voice coil affixed to said speaker cone and operative to vibrate therewith and a permanent magnet;
   said voice coil encircling said permanent magnet whereby an electric signal is induced in said voice coil when it is forced to vibrate by motion of said speaker cone;

said speaker cone having a low frequency cutoff;

a damping mass affixed to said speaker cone; and said speaker cone with said damping mass affixed thereto having a resonant frequency which is substantially lower than said low frequency cutoff of said speaker cone;

a triggerable timer;

at least one light source; and said triggerable timer being operative to energize said at least one light source in response to electrical signals from said acousto-electric transducer.

6. An apparatus according to claim 5; wherein said acousto-electric transducer further includes a resonant chamber surrounding said loudspeaker, said resonant chamber having a second resonant frequency substantially the same as said resonant frequency.

* * * * *